United States Patent
Blair et al.

(10) Patent No.: US 8,241,099 B2
(45) Date of Patent: Aug. 14, 2012

(54) GENERATING CUSTOM CREATURES

(75) Inventors: Thomas Blair, Austin, TX (US); Jesse Benjamin, Round Rock, TX (US); Travis Hicks, Cedar Park, TX (US)

(73) Assignee: Sony Online Entertainment LLC, San Diego, CA (US)

( * ) Notice: Subject to any disclaimer, the term of this patent is extended or adjusted under 35 U.S.C. 154(b) by 388 days.

(21) Appl. No.: 12/471,306

(22) Filed: May 22, 2009

(65) Prior Publication Data
US 2009/0305756 A1    Dec. 10, 2009

Related U.S. Application Data

(60) Provisional application No. 61/055,373, filed on May 22, 2008.

(51) Int. Cl.
A63F 9/24    (2006.01)

(52) U.S. Cl. .................. 463/9; 463/40; 463/42

(58) Field of Classification Search ............... 463/9, 40, 463/42
See application file for complete search history.

(56) References Cited

U.S. PATENT DOCUMENTS

| | | | |
|---|---|---|---|
| 7,025,675 | B2 | 4/2006 | Fogel et al. |
| 7,867,093 | B2 * | 1/2011 | Wright ........................... 463/42 |
| 2004/0029626 | A1 | 2/2004 | Annunziata | |
| 2007/0087835 | A1 | 4/2007 | Van Luchene | |

OTHER PUBLICATIONS

Star Wars Galaxies Warcry, "Star Wars Galaxies: Exploring Expertise: Beast Master," May 19, 2007, Star Wars Galaxies WarCry, accessed on Mar. 27, 2009 at http://swg.warcry.com/news/view/71933-Exploring-Experise-Beast-Master, 4 pages.

Smith, "Impossible Creatures Overview," May 21, 2003, Game Chronicles, accessed on Mar. 27, 2009 at http://www.gamechronicles.com/reviews/pc/impossible/creatures.htm, 3 pages.

Ryan A., "Preview: a Fallen Earth occurs," Oct. 3, 2006, mmorpg.qj.net, accessed on Mar. 27, 2009 at http://mmorpmg.net/category/Fallen-Earth/cid/1439, 14 pages.

Strategy Informer, "Requiem: Bloodymare (PC)," Strategy Informer, original date unknown, accessed on Mar. 27, 2009 at http://www.strategyinformer.com/pc/requiembloodymare/, 6 pages.

Ocampo, "Organic starships and genetic engineering are at the heart of the multiplayer mode in this real-time strategy game," Feb. 27, 2007, GameSpot, accessed on Mar. 27, 2009 at http://www.gamespot.com/pc/strategy/genesisrising/news/html?sid=6166491, 4 pages.

Strategyinformer, "Maelstrom (PC)," original date unknown, accessed on Mar. 27, 2009 at http://www.strategyinformer.com/pc/maelstrom/review.html, 8 pages.

* cited by examiner

*Primary Examiner* — Bradley K Smith
(74) *Attorney, Agent, or Firm* — Samuel S. Lee; Procopio, Cory, Hargreaves & Savitch LLP

(57) ABSTRACT

A computer-implemented method of growing and incubating custom creatures in a computer game, including: obtaining genetic properties; combining the genetic properties in combinations of attributes, skills, and appearances; incubating a creature with role-specific properties using the combined genetic properties; and displaying an egg object of the incubated creature on a display for transaction. Keywords include MMO, incubation, genetic properties, and egg object.

25 Claims, 5 Drawing Sheets

US 8,241,099 B2

GENERATING CUSTOM CREATURES

CROSS-REFERENCE TO RELATED APPLICATIONS

This application claims the benefit of priority of co-pending U.S. Provisional Patent Application No. 61/055,373, filed May 22, 2008, entitled "Beastmaster." The disclosure of the above-referenced provisional application is incorporated herein by reference.

BACKGROUND

A massively multiplayer online (MMO) role-playing game is an online computer game in which a large number of players interact with one another in a virtual world. As in most role-playing games, players assume the role of a fictional character (i.e., a Player Character) and take control over most of that character's actions. MMO games are distinguished from single-player or small multi-player games by the game's persistent world, usually hosted by a game provider, which continues to exist and evolve even when the player is away from the game.

The Player Character typically spends most of its time improving itself through the collection of experience points, which are earned, for example, through killing monsters and completing adventures assigned to the Player Character by server-controlled Non-Player Characters or Creatures (NPCs) scattered throughout the virtual world in strategic locations. NPCs are server-controlled characters who primarily exist in order to provide information, supplies, and rewards for the Player Characters. The NPCs are non-autonomous, seldom move of their own volition outside of a strictly limited area, and their attributes do not evolve over time. Their statistics, appearance and skill sets are static, and their possessions may or may not be dynamic.

Pets are a special form of Non-Player Character which occasionally accompany certain types of Player Characters. They are server-controlled partially-autonomous characters which unlike other NPCs, possess dynamic statistics and skill sets as well as the ability to move about the game environment by following around the Player Character to whom they belong.

SUMMARY

Implementations of the present invention provide for growing and incubating custom creatures in a computer game.

In one implementation, a method of growing and incubating custom creatures in a computer game includes: obtaining genetic properties; combining the genetic properties in combinations of attributes, skills, and appearances; incubating a creature with role-specific properties using the combined genetic properties; and displaying an egg object of the incubated creature on a display for transaction.

In another implementation, a computer-readable storage medium storing a computer program for growing and incubating custom creatures is disclosed. The program includes executable instructions that cause a computer to: obtain genetic properties; combine the genetic properties in combinations of attributes, skills, and appearances; incubate a creature with role-specific properties using the combined genetic properties; and display an egg object of the incubated creature on a display for transaction.

In yet another implementation, a computer-implemented method of incubating custom creatures for social interaction and/or combat in a computer game is disclosed. The method includes: looting and foraging for enzymes throughout the computer game; loading the enzymes into an incubator for incubation sessions; appropriately programming temperature, amount of enzymes, nutrients, and natural chemicals, to be added into the incubator; incubating a creature in the incubator; and displaying an egg object of the incubated creature on a display.

DETAILED DESCRIPTION

The present invention provides for implementations of a computer game which allow Player Characters (hereinafter referred to as "the players") to grow and incubate custom pets or creatures, training the creatures, and using the creatures for social interaction and/or aiding in combat. For example, one implementation provides a genetic engineering or incubation system for creatures/pets in a massively multiplayer online (MMO) game, such as Star Wars Galaxies™ offered by Sony Online Entertainment LLC.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one implementation, the players are enabled to: Harvest unique genetic properties from the creatures; Combine these genetic properties in unique combinations of attributes, skills, and appearances; and Create resulting creatures with role-specific properties. In this implementation, the players are allowed to control the creature's looks and base statistics. For example, the controls on the incubator are used to grow the creature's DNA strands from the earliest stages to eggs.

Figure 1:
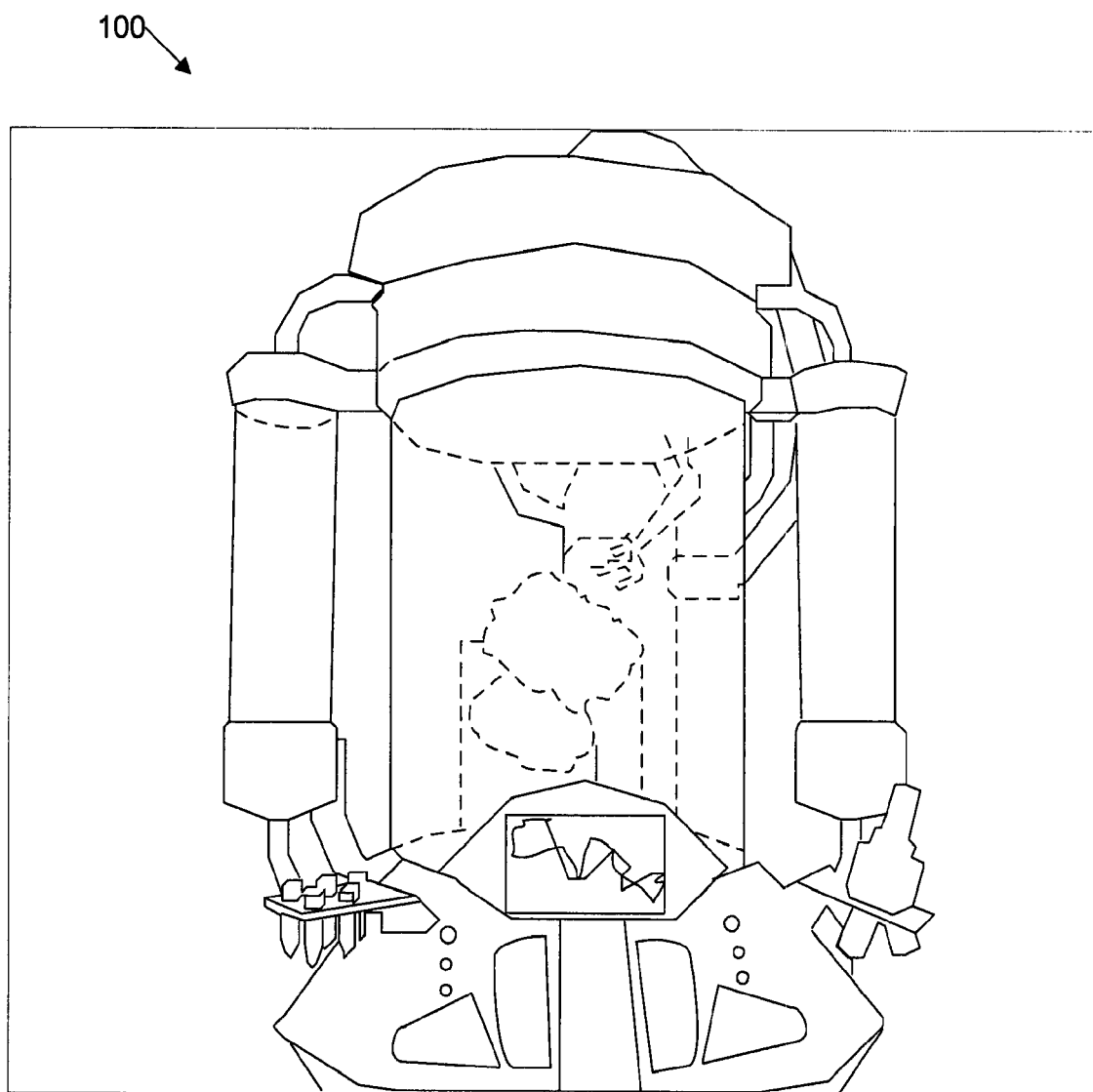
FIG. 1 shows an incubator used in a computer game in accordance with one implementation of the present invention.

In one specific implementation, the player is allowed to manipulate the controls on the incubator 100 (see FIG. 1) to control its temperature, amount of added enzymes, nutrients, and natural chemicals found in plants harvested on planets. In another specific implementation, a user interface 200 (see FIG. 2) is designed to allow the players to input resources they have acquired, adjust temperature, and adjust nutrients on the incubator. The user interface also allows the players to view what the creature inside the incubator currently looks like. As the players experiment and make changes during the incubator sessions, the players can peek in to view how the creature is developing.

In a further implementation, the players are allowed a chance to mutate their creatures. The mutation can range anywhere from replacing hair with feathers, added wings, added appendages, or even complete transformation. For example, klik-nik bases can be converted ("mutated") into pygmy acklays.

In other implementations, the incubator is designed by a structure trader; a player uses only one incubator at a time; and the player loots and forages for enzymes throughout the game. When the enzymes are to be loaded into the incubator, it can be done in a process similar to a crafting system. Players not interested in incubation can sell the obtained enzymes to other players. In further implementations, the player is allowed three incubation sessions, spaced 20 hours apart, to create the desired creature. In these implementations, all three sessions should be used before the creature is created. In the incubation process, all statistical modifications are in percentages and no statistics can be modified more than 20%. This percentage bonus is used to determine the creature's actual statistics.

Figure 2:
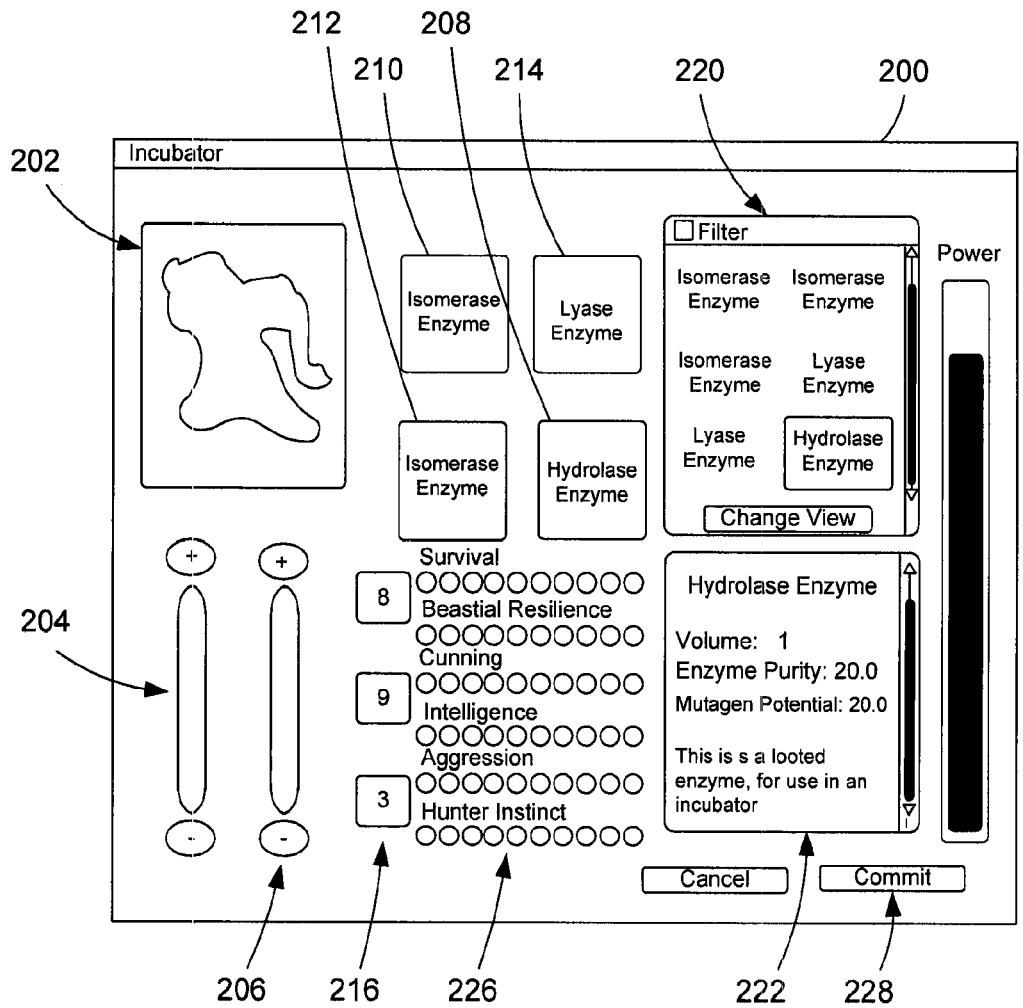
FIG. 2 illustrates a user interface (UI) of the incubator in accordance with one implementation of the present invention.

FIG. 2 illustrates a user interface (UI) 200 of the incubator in accordance with one implementation of the present invention. In the illustrated implementation of FIG. 2, the player drags and drops the enzymes from the player's inventory 230 onto the UI 200 of the incubator. When the enzymes are dragged over and dropped into the incubator UI 200, the enzymes are removed from the player's inventory 230. The enzymes are added to the incubator. If the player cancels the incubation session, then the enzymes are returned to the player's inventory 230. Once committed, the enzymes are destroyed.

The incubator UI 200, shown in FIG. 2, includes a creature window 202, a temperature gauge 204, a nutrient gauge/slider 206, a hydrolases enzyme slot 208, isomerases enzyme slots 210, 212, a lyases enzyme slot 214, an inventory filter 220, an enzyme examine window 222, a power gauge 224, and a creature skills list 226. The creature window 202 displays an image of what the creature inside looks like during the incubation process. As the player experiment and make changes during the incubator sessions, the player can peek in to view how the creature is developing. If a creature mutates while the creature is in the incubator, the player will be able to see what it looks like in the creature window 202.

In the illustrated implementation of FIG. 2, the temperature gauge 204 controls the temperature inside the incubator. The temperature can be controlled by pressing the plus sign (+) to increase the temperature and the minus sign (−) to decrease the temperature. The temperature gauge 204 is typically used in conjunction with a first group of enzymes 210 (e.g., isomerases enzymes), and is used to help determine the color hue of the creature's hide. The cooler temperature generates cooler color (e.g., blue), and the warmer temperature generates warmer color (e.g., red).

In the illustrated implementation of FIG. 2, a second group of enzymes 214 (e.g., lyases enzymes) and a third group of enzymes 212 (e.g., isomerases enzymes) work together to determine attributes and bonuses of the creature. The second group of enzymes 214 determines which random statistics are affected. These enzymes 214 list one specific statistic that will be affected, and a number of random statistics. There will also be some enzymes that have 3 to 4 random statistics, with no specific statistics displayed. The trade off is that more statistics are affected, but there is no knowledge about which ones are affected. Statistics that can be modified include strength, precision, agility, luck, and constitution (e.g., health). The second group of enzymes 214 can be found throughout the galaxy by foraging.

The third group of enzymes 212 determines how much of the random statistics in the second group of enzymes 214 are affected. This group of enzymes 212 can be found throughout the galaxy as loot, and affects how many total bonus points will be available. In one implementation, the creatures can have up to 12 attributes and up to 11 of them can be altered per session. The quality (i.e., resource attribute) of the third group of enzymes affects how many bonus points can be applied in relation to the attribute bonuses associated with the second group of enzymes. Accordingly, the attributes of these two groups of enzymes and how they are mixed determines the final attributes and attribute bonuses of the creature. The final results are available once the session is complete.

The incubator UI 200 also includes a list of special skills 226 of the creature that can be added by a player based on the location of the nutrient gauge 206. The nutrient gauge 206 is used in conjunction with a fourth group of enzymes (e.g., hydrolases enzymes) which determines how many specialized skills are allocated. Thus, the skills that can be allocated are determined by where the nutrient gauge 206 is placed. When the player drops in the slot 208 for the fourth group of enzymes, the points allowed per skill set is auto-populated. These are color coded for clarity. The values are determined by the nutrient gauge 206. At the beginning of each session, the UI 200 populates the number of points spent in each skill. These points 216 are indicated with different shades or hues to differentiate between past submission points and current submission points. By providing more nutrients, more points can be devoted to the defensive skills. By contrast, more points are devoted to the aggressive skills by providing fewer nutrients. Intelligence skills are positioned on the center of the nutrient gauge 206 so that there is always at least one point devoted to intelligence skills regardless of where the scale is set.

Once nutrients have been added to the incubator, the nutrient level can be adjusted by pressing the plus sign (+) and minus sign (−) on the nutrient gauge 206 to change the settings. Changing the nutrient settings will adjust the point distribution allotted for the creature's skills.

In one implementation, the fourth group of enzymes can be acquired by extracting them from dead creatures. The extraction tools can be crafted and sold (or used) by munitions traders. These enzymes are acquired with a base chance of adding a flat rate of 1 to 3 points. The players can increase the chance by playing a mini-game, which allows the player to add an enzyme containing up to 10 points. Using a series of in-game tools, the extracted enzymes can be rebuilt into a "better" version, which is created to the specifications of the players. Thus, if the players want to have more points to assign towards skills, the players can refine the enzymes to have a higher "purity" score. If the players want to push their chances at a mutation up, they can refine it to have a higher mutagen level.

In one example of an enzyme mini game mentioned above, a player purchases or spends the requisite expertise points to use the tools for extraction. Using the tools, the player takes samples from dead creatures and collects base material samples. In one game sequence, a sample from a dead creature is first split into parts (e.g., DNA sample parts 1 through 5), and one (or more) of the parts is given to the player as a piece of a puzzle. The part received by the player is selected at random. Next, the sample parts collected from dead creatures (each sample part is taken from one dead creature) by a player are combined in a combiner to produce a working enzyme base. The final enzyme sequence is then recorded into a completed object which is ready to be used in the incubator.

In one particular example using the mini game sequence described above, a sample is extracted from a dead Acklay resulting in a sample with a +3 rating. Next, the +3 rating sample is run through a separator to obtain two A-bits with a +3 rating and One C-bit with a +1 rating. Then, +3 A-bit and my +1 C-bit are combined with a +2 B, D, and E bits gathered from an earlier adventure to finish with a +2 (i.e., average) sample. The sample is then processed to gain an additional +1 to the rating from the final combine. The eight rated enzyme (base 5+3) is used to provide 8 points to customize the pet in the incubation process.

In another implementation, the first group and the third group of enzymes (e.g., isomerases enzymes) have a visible quality value. The quality determines the amount of potential attribute bonuses the creature will have when it is finally hatched. The first group of enzymes affects the creature's armor. Which statistics and how much depend on the temperature of the incubator. For example, the base damage statistics are affected more when the incubator's temperature is hot. However, the armor statistics are affected more when the incubator's temperature is cold. These groups of enzymes can be found throughout the galaxy by looting creatures.

The inventory filter 220 operates similarly to a crafting window filter by displaying only enzymes that are in the player's inventory. The enzyme examine window 222 displays the enzyme's key information when an enzyme is selected in the inventory window 230. The same information can be obtained by examining the enzyme.

The incubators run on geothermal power which can be placed into the incubator by selecting the "Deposit Power" option on the radial menu. The power gauge 224 displays how much power is in the incubator.

As described above, creating a creature with the incubator occurs in three experimentation sessions. All of the controls can be adjusted during each of the three sessions. Further, between each session, the incubator can be examined to find out: the type of creature that is in the incubator; the amount of skill points the creature has and how the points are currently distributed; current attribute bonuses; and the amount of remaining time until the next experimentation session.

In one implementation, each creature has six skills which are displayed on the creature skills list 226. The skills can be adjusted during each of the three experimentation sessions. The survival and beastial resilience skills represent defensive skills of the creature. The cunning and intelligence skills represent intellectual skills of the creature. The aggression and hunter's instinct skills represent aggressive skills of the creature. In another implementation, a player has a number of points that can be spent towards adjusting the properties of the creature. For example, each of enzyme/chemical, temperature, and nutrient costs a certain number of points.

When a player issues a final commit by pressing a commit button 228, a trigger is set from the code. This trigger contains all values (e.g., temperature scale, nutrient scale, value for each enzyme category, total points spent, initial creature template, and enzyme colors used) entered by the player. All of these values are used in a script to obtain a final product.

Once the incubation period has ended, the player receives an egg object, which is transferable. The egg object has a detail attribute listing the type of creature that is inside. The object may also include an option to allow the players to view the inside of the creature.

Figure 3:
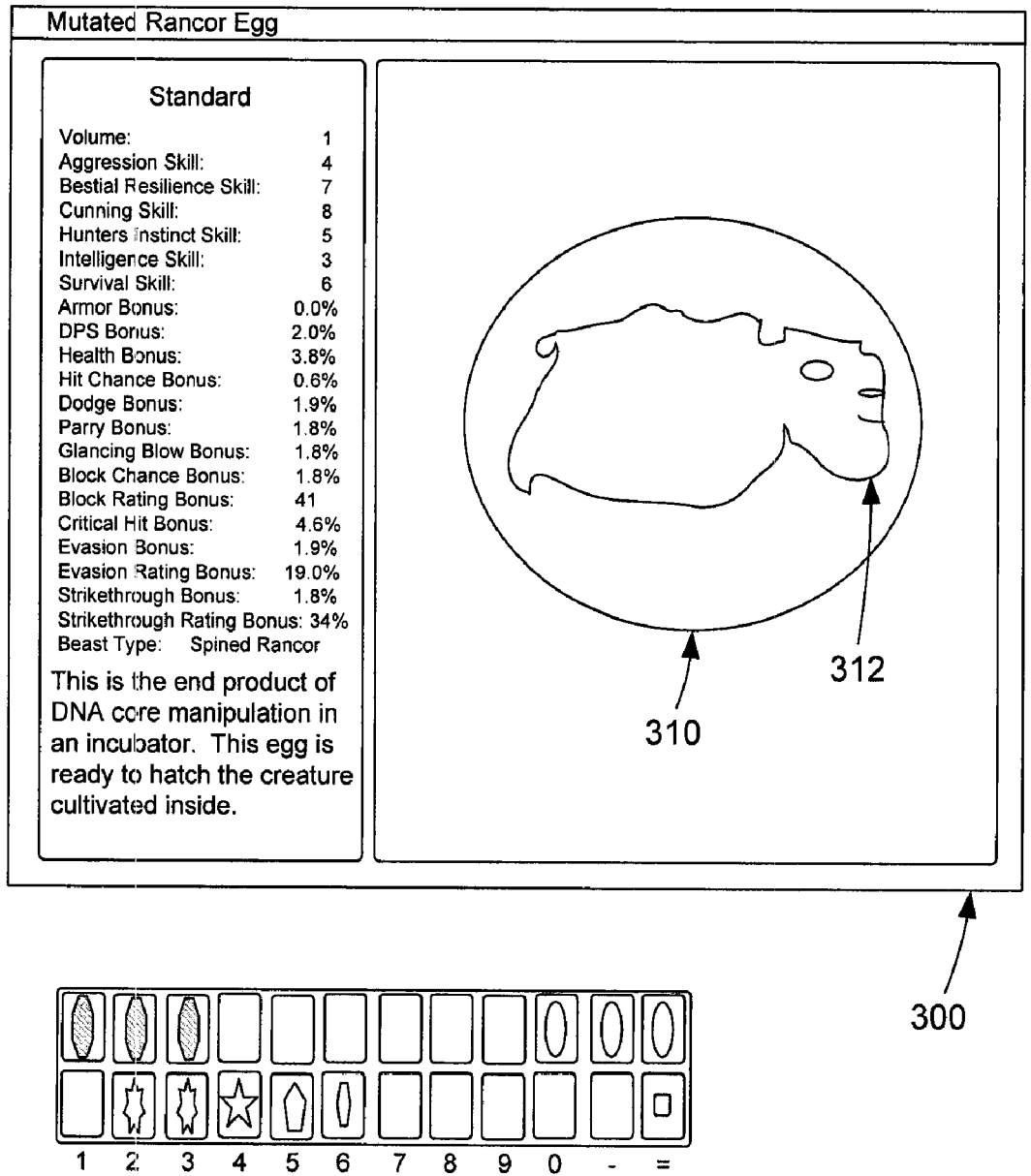
FIG. 3 shows one example of a viewing window showing the egg object and the creature that is inside the egg object.

FIG. 3 shows one example of a viewing window 300 showing the egg object 310 and the creature 312 that is inside the egg object. Providing the viewing window 300 for displaying the egg object 310 prevents anyone from being easily tricked. Once the creature egg object has been created and is placed in the player's inventory, the player can: hatch the egg to create the creature (the creature is owned by whichever player hatched the egg); or sell the egg object on the commodities market.

If the creature is trained as a mount, and the player who owns the egg object has that expertise. In this case, an option can be added to allow the player to receive the expertise if desired. Once the player decides to "hatch" the egg object, the player receives a pet control device. In this case, the egg object is bio-linked to the player, and the player can no longer trade the creature.

Figure 4:
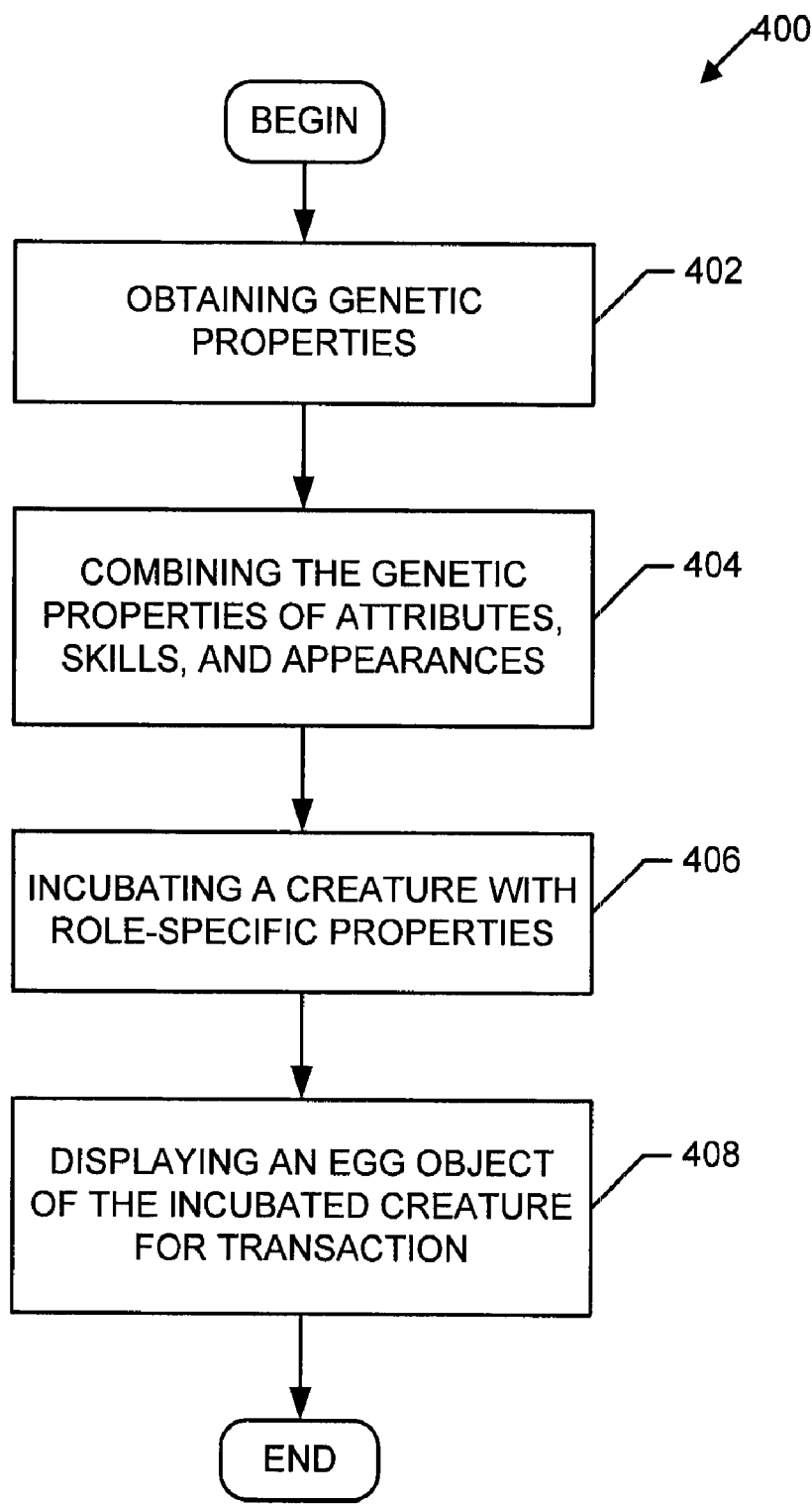
FIG. 4 shows a flowchart implementing a computer game that allows the players to grow and incubate custom pets or creatures according to one implementation of the present invention.

FIG. 4 shows a flowchart 400 implementing a computer game that allows the players to grow and incubate custom pets or creatures according to one implementation of the present invention. The computer game includes obtaining genetic properties, at box 402, from creatures including plants. In one implementation, the genetic properties are harvested or looted, and include enzymes, nutrients, and natural chemicals. At box 404, the genetic properties are combined in unique combinations of attributes, skills, and appearances.

The computer game also includes incubating a creature with role-specific properties, at box 406, using the combined genetic properties. In one implementation, the player is allowed to manipulate the controls on the incubator to control its temperature, amount of added enzymes, nutrients, and natural chemicals. In the computer game, the incubator is controlled using a user interface designed to allow the players to input resources they have acquired, adjust temperature, and adjust nutrients. The user interface also allows the players to view what the creature inside the incubator currently looks like. As the players experiment and make changes during the incubator sessions, the players can peek in to view how the creature is developing. In another implementation, the players are allowed a chance to mutate their creatures. The mutation can range anywhere from replacing hair with feathers, added wings, added appendages, or even complete transformation.

The computer game further includes displaying an egg object of the incubated creature on a display for transaction, at box 408. For example, the egg object and the creature that is inside the egg object can be examined using the viewing window 300 (see FIG. 3). Providing the viewing window 300 for displaying and examining the egg object 310 prevents buyers from being easily tricked. Once the egg object has been created and is placed in the player's inventory (i.e., the inventory of the player that incubated the creature), the player can "hatch" the egg to create the creature or sell the egg object on the commodities market. Once the player decides to hatch the egg object, the player receives a pet control device. In this case, the egg object is bio-linked to the player, and the player can no longer trade the creature.

In some implementations, a data table is generated that includes statistics for each level of the creature. The generated percentages are added to the base statistics. The data table of creatures is then referenced. The data table has columns for ranges of successes. Each row represents the starting base creature egg object. With the data retrieved from the incubator sessions, values are assigned to determine the column for the player's new creature. Thus, each cell represents the base creature. In order to move over columns in the data table, thereby forcing a minor mutation, the player must come up with at least one correct color combination, and have used quality resources. The quality resources help increase the random chances of upgraded creatures. The percentages are based on the average amount of points used/spent in each session. Thus, the percentage is calculated by dividing the total amount spent by the total amount possible.

In other implementations, a player is given a chance to provide the creature with a free initial ability. This is driven by the points used in the nutrient slider skills. The creature is more likely to get a free initial skill at birth when more points are added to a specific skill type. Power includes geo-thermal energy, currently spawning in the game, but with no way to harvest. A survey tool allows hunting and extraction of this energy. In this implementation, the players harvest this energy by hand.

Figure 5A:
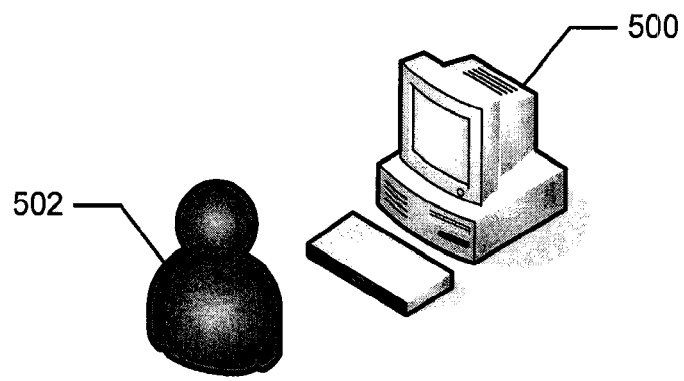
FIG. 5A illustrates a representation of a computer system and a user.

FIG. 5A illustrates a representation of a computer system 500 and a user 502. The user 502 uses the computer system 500 to perform creature incubation. The computer system 500 stores and executes an incubation system 590.

Figure 5B:
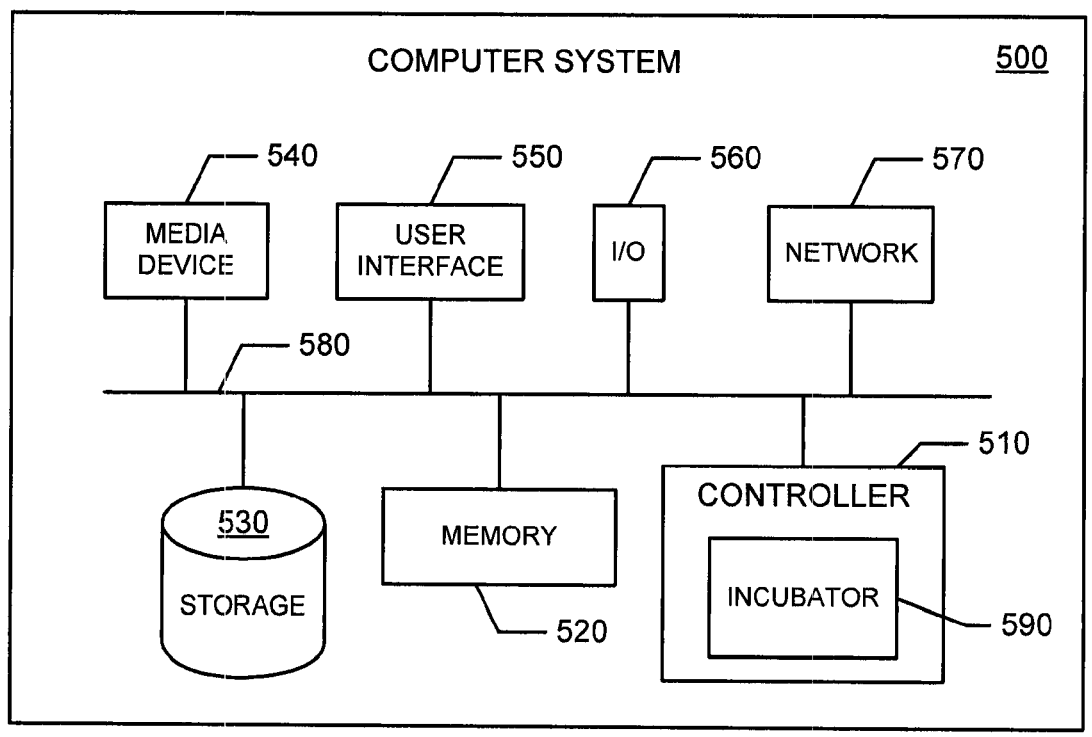
FIG. 5B is a functional block diagram illustrating the computer system hosting an incubation system.

FIG. 5B is a functional block diagram illustrating the computer system 500 hosting the incubation system 590. The controller 510 is a programmable processor and controls the operation of the computer system 500 and its components. The controller 510 loads instructions (e.g., in the form of a computer program) from the memory 520 or an embedded controller memory (not shown) and executes these instructions to control the system. In its execution, the controller 510 provides the incubator 490 as a software system. Alternatively, this service can be implemented as separate hardware components in the controller 510 or the computer system 500.

Memory 520 stores data temporarily for use by the other components of the computer system 500. In one implementation, memory 520 is implemented as RAM. In one implementation, memory 520 also includes long-term or permanent memory, such as flash memory and/or ROM.

Storage 530 stores data temporarily or long term for use by other components of the computer system 500, such as for storing data used by the incubation system 590. In one implementation, storage 530 is a hard disk drive.

The media device 540 receives removable media and reads and/or writes data to the inserted media. In one implementation, for example, the media device 540 is an optical disc drive.

The user interface 550 includes components for accepting user input from the user of the computer system 500 and presenting information to the user. In one implementation, the user interface 550 includes a keyboard, a mouse, audio speakers, and a display. The controller 510 uses input from the user to adjust the operation of the computer system 500.

The I/O interface 560 includes one or more I/O ports to connect to corresponding I/O devices, such as external storage or supplemental devices (e.g., a printer or a PDA). In one implementation, the ports of the I/O interface 560 include ports such as: USB ports, PCMCIA ports, serial ports, and/or parallel ports. In another implementation, the I/O interface 560 includes a wireless interface for communication with external devices wirelessly.

The network interface 570 includes a wired and/or wireless network connection, such as an RJ-45 or "Wi-Fi" interface (including, but not limited to 802.11) supporting an Ethernet connection.

The computer system 500 includes additional hardware and software typical of computer systems (e.g., power, cooling, operating system), though these components are not specifically shown in FIG. 5B for simplicity. In other implementations, different configurations of the computer system can be used (e.g., different bus or storage configurations or a multi-processor configuration).

The above-described technology is applicable in various types of game settings in addition to science fiction, such as fantasy or superhero games. In other settings, the types of creatures or characters being developed may be different as well. For example, in a fantasy setting, a player may use a magical creature skill to create new types of magical servants, monsters, undead, or demons. In a superhero context, a player could work to create new mutations or super-powered animals. In another context, the player could play at being a mad scientist to create strange and fantastic new animals or monsters. In these situations, the operation of the technology supporting the gameplay for creature creation would be as described herein.

In one implementation, a player can add other items during the incubation process to induce changes or mutations in the creature's development. For example, adding magical reagents during the process could affect the magical properties of a magical creature being created. Similarly, adding metals or other materials could affect the composition of a mutant creature being created.

In one implementation, the player could start with an existing animal (or other entity, such as a person or even a player character) rather than DNA or an egg and cause that animal to change through mutations.

In one implementation, the environment during creation can affect the process as well. For example, the location of the incubator may have an effect if the location has high radioactivity or magical power. Similarly, the time of day or year could also be considered.

In one implementation, the player can use these techniques to create other types of items, such as diseases or plants. A player could use the created diseases for beneficial effects (buffs, cures) or as weapons. Plants could be used for decoration, as defensive installations, or to provide buffs/de-buffs in an area.

In one implementation, a player can create recordings or recipes from the player's research or work in creating beasts. The recording can be used to attempt to create the same creature. Alternatively, the recording can be partial to show how to reach a point in the process (for a multi-step creation). In one version, the recording can include steps that have a random effect or a percentage chance of success to reflect that the character does not fully understand how the process worked. If that recording is used, the result is not entirely predictable. The skill level of the character determines whether there are these mystery slots and the type. For example a very low skill level may cause multiple unknown entries with low likelihoods of success. A very high skill level may have no mystery slots, or have slots with very high likelihoods of success. The recordings can be sold or traded, encouraging high skill players to continue their research to enable others to recreate their work. In one variation new recordings can be made from existing recordings, furthering research.

Various implementations are or can be implemented primarily in hardware using, for example, components such as application specific integrated circuits ("ASICs"), or field programmable gate arrays ("FPGAs"). Implementations of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A non-transitory storage medium storing a computer game including a method of growing and incubating custom creatures, the method comprising:
   obtaining genetic properties;
   combining the genetic properties in combinations of attributes, skills, and appearances;
   incubating a creature with role-specific properties using the combined genetic properties; and
   displaying an egg object of the incubated creature on a display for transaction.

2. The storage medium of claim 1, wherein obtaining genetic properties comprises
   harvesting or looting from creatures including plants harvested on planets.

3. The storage medium of claim 1, wherein the genetic properties comprise
   enzymes, nutrients, and natural chemicals.

4. The storage medium of claim 1, wherein incubating a creature comprises
   controlling temperature, amount of added enzymes, nutrients, and natural chemicals.

5. The storage medium of claim 1, wherein incubating a creature comprises
   displaying what the creature currently looks like.

6. The storage medium of claim 1, further comprising
   mutating the creature.

7. The storage medium of claim 1, further comprising
   hatching the egg object to create the creature.

8. The storage medium of claim 1, further comprising
   selling the egg object on a commodities market.

9. The storage medium of claim 1, wherein incubating a creature comprises
   performing three incubation sessions.

10. The storage medium of claim 1, wherein incubating a creature comprises
    incubating the creature inside an incubator; and
    displaying an image of what the creature inside the incubator looks like.

11. The storage medium of claim 10, wherein the incubator comprises
    a temperature gauge configured to control temperature inside the incubator.

12. The storage medium of claim 11, wherein the temperature inside the incubator determines color hue of the creature's hide.

13. The storage medium of claim 10, wherein the incubator displays
    a list of special skills of the creature that can be added by a player.

14. The storage medium of claim 1, wherein the genetic properties comprise
    at least one group of enzymes which affects an armor of the creature, said at least one group of enzymes affecting the armor based on temperature of the incubator.

15. The storage medium of claim 1, further comprising
    generating a data table that includes statistics for each level of the creature.

16. A non-transitory computer-readable storage medium storing a computer program for growing and incubating custom creatures, the program comprising executable instructions that cause a computer to:
    obtain genetic properties;
    combine the genetic properties in combinations of attributes, skills, and appearances;
    incubate a creature with role-specific properties using the combined genetic properties; and
    display an egg object of the incubated creature on a display for transaction.

17. The computer-readable storage medium of claim 16, wherein the program comprising executable instructions that cause a computer to obtain genetic properties comprises executable instructions that cause the computer to
    harvest or loot from creatures including plants harvested on planets.

18. The computer-readable storage medium of claim 16, wherein the program comprising executable instructions that cause a computer to incubate a creature comprises executable instructions that cause the computer to control temperature, amount of added enzymes, nutrients, and natural chemicals.

19. The computer-readable storage medium of claim 16, wherein the program comprising executable instructions that cause a computer to incubate a creature comprises executable instructions that cause the computer to display what the creature currently looks like.

20. The computer-readable storage medium of claim 16, further comprising executable instructions that cause a computer to sell the egg object on a commodities market.

21. The computer-readable storage medium of claim 16, further comprising executable instructions that cause a computer to generate a data table that includes statistics for each level of the creature.

22. A non-transitory storage medium storing a computer game including a method of incubating custom creatures for social interaction and/or combat, the method comprising:

looting and foraging for enzymes throughout the computer game;

loading the enzymes into an incubator for incubation sessions;

appropriately programming temperature, amount of enzymes, nutrients, and natural chemicals, to be added into the incubator;

incubating a creature in the incubator; and displaying an egg object of the incubated creature on a display.

23. The storage medium of claim 22, further comprising displaying the egg object for selling it on a commodities market.

24. The storage medium of claim 22, further comprising hatching the egg object to create the creature.

25. The storage medium of claim 24, further comprising receiving a pet control device which controls the creature.

\* \* \* \* \*